(12) United States Patent
Murayama et al.

(10) Patent No.: US 8,340,877 B2
(45) Date of Patent: Dec. 25, 2012

(54) ENGINE SPEED SYNCHRONIZER AND ENGINE SPEED SYNCHRONIZATION METHOD FOR MANUAL TRANSMISSION WITH ENGINE CLUTCH

(75) Inventors: Masami Murayama, Chigasaki (JP); Masahiro Iriyama, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 692 days.

(21) Appl. No.: 12/428,538

(22) Filed: Apr. 23, 2009

(65) Prior Publication Data

US 2009/0326771 A1 Dec. 31, 2009

(30) Foreign Application Priority Data

Jun. 25, 2008 (JP) .................................. 2008-165224

(51) Int. Cl.
*G06F 19/00* (2006.01)

(52) U.S. Cl. ................ 701/54; 701/66; 701/67; 701/68; 701/90; 701/91

(58) Field of Classification Search ................ 701/54, 701/66, 67, 68; 477/90, 91
See application file for complete search history.

(56) References Cited

U.S. PATENT DOCUMENTS

| 4,593,580 | A | | 6/1986 | Schulze |
| 5,272,939 | A | * | 12/1993 | Markyvech et al. .......... 477/120 |
| 6,095,947 | A | | 8/2000 | Genise |
| 6,461,272 | B1 | * | 10/2002 | Boardman et al. ............. 477/91 |
| 2002/0111732 | A1 | * | 8/2002 | Jager et al. ...................... 701/62 |
| 2002/0151410 | A1 | | 10/2002 | Boardman et al. |
| 2007/0026996 | A1 | * | 2/2007 | Ayabe et al. .................. 477/107 |

FOREIGN PATENT DOCUMENTS

| DE | 30 45 840 A1 | 7/1982 |
| DE | 40 12 595 A1 | 10/1991 |
| DE | 44 22 554 C1 | 10/1995 |
| GB | 2 243 655 A | 11/1991 |
| JP | 2007-46674 | 2/2007 |

* cited by examiner

*Primary Examiner* — Lesley D Morris
*Assistant Examiner* — Jacob Knutson
(74) *Attorney, Agent, or Firm* — Foley & Lardner LLP (57) ABSTRACT

An engine speed synchronizer for a manual transmission with an engine clutch, synchronizes rotation of the engine side of the engine clutch with rotation of the transmission side of the engine clutch by engine speed control with reference to operation of a shift lever under condition that the engine clutch is disengaged. The engine speed synchronizer determines whether or not a transmission input speed has started to change in a direction conforming to the operation of the shift lever; permits the synchronization in response to determination that the transmission input speed has started to change in the conforming direction; and inhibits the synchronization in response to determination that the transmission input speed has not started to change in the conforming direction.

8 Claims, 7 Drawing Sheets

ENGINE SPEED SYNCHRONIZER AND ENGINE SPEED SYNCHRONIZATION METHOD FOR MANUAL TRANSMISSION WITH ENGINE CLUTCH

BACKGROUND OF THE INVENTION

The present invention relates generally to manual transmissions, such as common manual transmissions and automated manual transmissions, which are provided with engine clutches, and particularly to engine speed synchronizers and engine speed synchronization methods for synchronizing rotational speeds of engine-side and transmission-side engaging elements of such an engine clutch by engine speed control under condition that the engine clutch is disengaged.

Manual transmissions are shifted from one speed gear to another by disengaging an engine clutch to disconnect an engine, and then operating a shift lever so as to disengage the one speed gear and engage the other under condition that the engine clutch is disengaged, and finally engaging the engine clutch to connect the engine.

If the engine clutch is engaged after operation of the shift lever under condition that the rotational speeds of the engine-side and transmission-side engaging elements of the engine clutch are not synchronous with each other, the engagement of the engine clutch may cause a great shock. If the engine clutch is engaged when the rotational speeds of the engaging elements conform to each other by chance, it may take much time to complete the shift.

Japanese Patent Application Publication No. 2007-046674 discloses a technique of engine speed synchronization control for a manual transmission. This technique is implemented by: determining a target one of speed gears of the manual transmission with reference to operation of a shift lever; calculating a target transmission input speed for the target speed gear on a basis of the transmission gear ratio of the target speed gear and transmission output speed (vehicle speed); conforming the engine speed (or the rotational speed of an engine-side engaging element of an engine clutch) to the target transmission input speed (or the rotational speed of a transmission-side engaging element of the engine clutch) under condition that the engine clutch is disengaged for allowing the manual transmission to be shifted.

SUMMARY OF THE INVENTION

In general manual transmissions, individual speed gears are engaged by a selecting operation of moving a shift lever in a selecting direction (or vehicle lateral direction) to one of selecting positions which corresponds to a target one of speed gears, and a shifting operation of moving the shift lever forward or backward in a shifting direction (or vehicle longitudinal direction) from the one of selecting positions to one of shifting positions after the selecting operation.

Accordingly, manual transmissions are shifted from a current speed gear to a target speed gear by: a shifting operation of moving the shift lever from a shifting position corresponding to the current speed gear to a neutral position in which selecting operation is possible; a selecting operation of moving the shift lever in the neutral position to a selecting position corresponding to the target speed gear; and a shifting operation of moving the shift lever from this selecting position to a shifting position corresponding to the target speed gear.

Here, diagonal shifting operation is defined as a shifting operation of continuously moving a shift lever at one stroke from a current speed gear position to a target speed gear position, with a force applied to the shift lever in the selecting direction, where the current speed gear position and the target speed gear position are diagonal with respect to each other, in contrast to the normal operation described above. Diagonal shifting operation may cause problems as described below.

In a case in which fourth gear is a current speed gear, and fifth gear is a target speed gear, for example, diagonal shifting operation of a shift lever from fourth gear to fifth gear may cause a sensor to determine that the shift lever moves from the fourth gear position to a third gear position which has the same selecting position as the fourth gear position, and then moves from the third gear position to the fifth gear position.

According to the technique of Japanese Patent Application Publication No. 2007-046674, during the diagonal shifting operation described above, the engine speed may be controlled to increase to conform to a transmission input speed calculated for third gear in response to the movement of the shift lever from the fourth gear position to the third gear position, and then decrease to conform to a transmission input speed calculated for fifth gear in response to the movement of the shift lever from the third gear position to the fifth gear position. This engine speed synchronization control may thus cause the engine speed to temporarily increase, although the fourth to fifth gearshift is an upshift which requires a decrease of the engine speed. This may make the driver uncomfortable.

In view of the foregoing, it is desirable to provide an engine speed synchronizer and an engine speed synchronization method which prevent engine speed from changing in undesired directions.

According to one aspect of the present invention, an engine speed synchronizer for a powertrain including an engine, a manual transmission and an engine clutch, the manual transmission including a shift lever arranged to individually engage speed gears of the manual transmission, the engine clutch having an engine side connected to an output side of the engine and a transmission side connected to an input side of the manual transmission, comprises: a first sensor for sensing operation of the shift lever; a second sensor for measuring a transmission input speed as a rotational speed of the input side of the manual transmission; and a controller connected to the first and second sensors, and configured to: synchronize rotation of the engine side of the engine clutch with rotation of the transmission side of the engine clutch by controlling with reference to an operation of the shift lever an engine speed as a rotational speed of the output side of the engine, under condition that the engine clutch is disengaged; determine whether or not the transmission input speed has started to change in a direction conforming to the operation of the shift lever; permit the synchronization in response to determination that the transmission input speed has started to change in the conforming direction; and inhibit the synchronization in response to determination that the transmission input speed has not started to change in the conforming direction.

According to another aspect of the present invention, an engine speed synchronizer for a powertrain including an engine, a manual transmission and an engine clutch, the manual transmission including a shift lever arranged to individually engage speed gears of the manual transmission, the engine clutch having an engine side connected to an output side of the engine and a transmission side connected to an input side of the manual transmission, comprises: means for sensing operation of the shift lever; means for measuring a transmission input speed as a rotational speed of the input side of the manual transmission; and means for: synchronizing rotation of the engine side of the engine clutch with rotation of the transmission side of the engine clutch by controlling with reference to an operation of the shift lever an engine speed as a rotational speed of the output side of the engine, under condition that the engine clutch is disengaged; determining whether or not the transmission input speed has started to change in a direction conforming to the operation of the shift lever; permitting the synchronization in response to determination that the transmission input speed has started to change in the conforming direction; and inhibiting the synchronization in response to determination that the transmission input speed has not started to change in the conforming direction.

According to a further aspect of the present invention, an engine speed synchronization method for a powertrain including an engine, a manual transmission and an engine clutch, the manual transmission including a shift lever arranged to individually engage speed gears of the manual transmission, the engine clutch having an engine side connected to an output side of the engine and a transmission side connected to an input side of the manual transmission, comprises: sensing operation of the shift lever; measuring a transmission input speed as a rotational speed of the input side of the manual transmission; synchronizing rotation of the engine side of the engine clutch with rotation of the transmission side of the engine clutch by controlling with reference to an operation of the shift lever an engine speed as a rotational speed of the output side of the engine, under condition that the engine clutch is disengaged; determining whether or not the transmission input speed has started to change in a direction conforming to the operation of the shift lever; permitting the synchronization in response to determination that the transmission input speed has started to change in the conforming direction; and inhibiting the synchronization in response to determination that the transmission input speed has not started to change in the conforming direction.

DETAILED DESCRIPTION OF THE INVENTION

Figure 1:
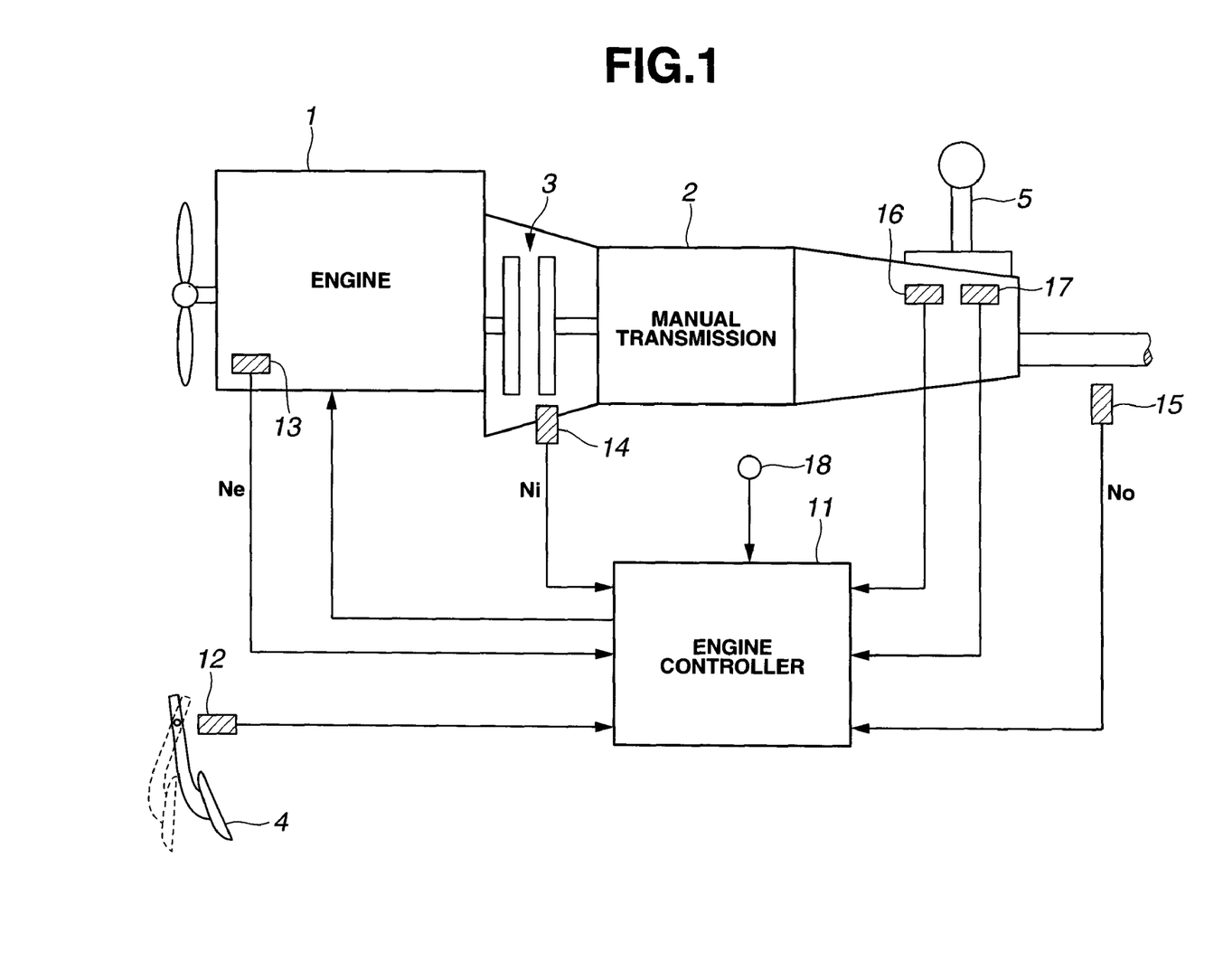
FIG. 1 is a schematic diagram showing a powertrain system of an automotive vehicle in which a manual transmission is provided with an engine speed synchronizer according to a first embodiment of the present invention.

FIG. 1 schematically shows a powertrain system of an automotive vehicle in which a manual transmission is provided with an engine speed synchronizer according to a first embodiment of the present invention. As shown in FIG. 1, an engine clutch 3 is arranged between an engine 1 and a manual transmission 2. In this example, manual transmission 2 is a six forward speed and one reverse speed manual transmission.

Engine clutch 3 has an engine side connected to an output side of engine 1, and a transmission side connected to an input side of manual transmission 2. Engine clutch 3 is normally engaged by an internal spring, to drivingly connect engine 1 to manual transmission 2. In response to depression of a clutch pedal 4, engine clutch 3 is disengaged to disconnect engine 1 from manual transmission 2. Manual transmission 2 is provided with a shift lever 5 which is adapted for driver's operation, and arranged to individually engage speed gears of manual transmission 2. Operation of shift lever 5 causes manual transmission 2 to be shifted into a state in which one of the speed gears is selected and engaged through a synchromesh mechanism.

Figure 2:
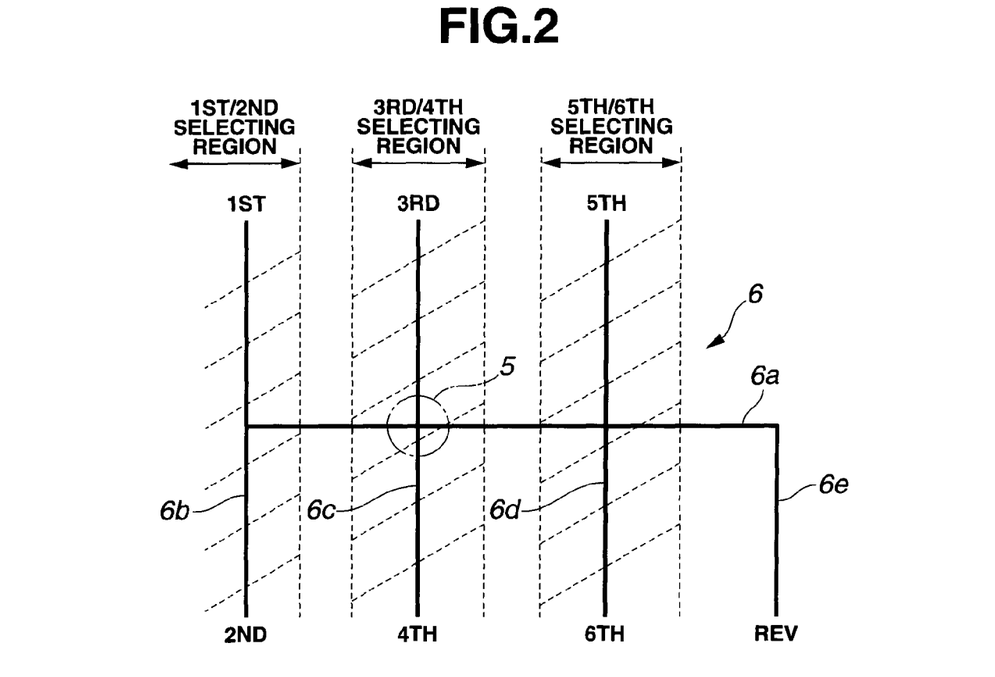
FIG. 2 is a first schematic plan view of a shift gate of the manual transmission of FIG. 1 in which three selecting regions are defined for determining a selecting position of a shift lever of the manual transmission.
Figure 3:
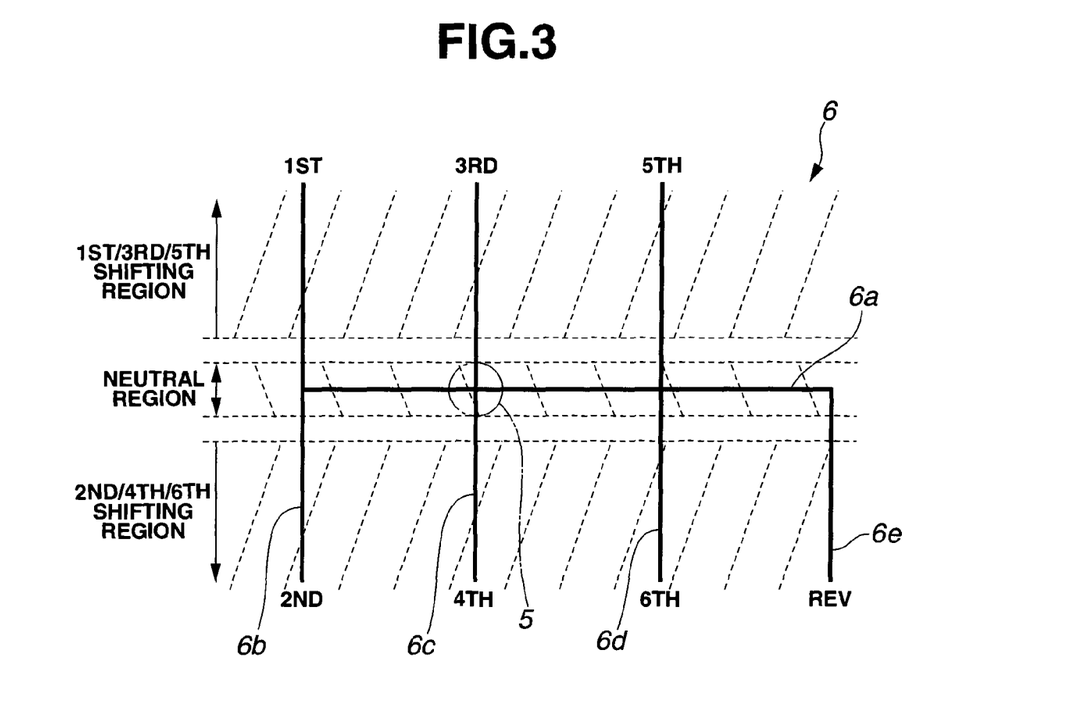
FIG. 3 is a second schematic plan view of the shift gate of FIG. 2 in which three shifting regions are defined for determining a shifting position of the shift lever.

Shift lever 5 is operated or moved along slots of a shift gate 6 as viewed from above the vehicle in FIGS. 2 and 3. Shift gate 6 guides selecting operation of shift lever 5 in a selecting direction or vehicle lateral direction (or horizontal direction in FIGS. 2 and 3), and also guides shifting operation of shift lever 5 in a shifting direction or vehicle longitudinal direction (or vertical direction in FIGS. 2 and 3). Specifically, shift gate 6 includes a neutral gate section 6a, a 1st-2nd gate section 6b, a 3rd-4th gate section 6c, a 5th-6th gate section 6d and a reverse gate section 6e. The neutral gate section 6a is formed to extend in the selecting direction or vehicle lateral direction (or in the horizontal direction in FIGS. 2 and 3). The 1st-2nd gate section 6b is connected at its center to the left end of the neutral gate section 6a, and formed to extend from the connecting point forward and backward in the shifting direction or vehicle longitudinal direction (or upward and downward in the vertical direction in FIGS. 2 and 3). The 3rd-4th gate section 6c is connected at its center to the left side of the center of the neutral gate section 6a, and formed to extend from the connecting point forward and backward in the shifting direction or vehicle longitudinal direction (or upward and downward in the vertical direction in FIGS. 2 and 3). The 5th-6th gate section 6d is connected at its center to the right side of the center of the neutral gate section 6a, and formed to extend from the connecting point forward and backward in the shifting direction or vehicle longitudinal direction (or upward and downward in the vertical direction in FIGS. 2 and 3). The reverse gate section 6e is connected at its one end to the right end of the neutral gate section 6a, and formed to extend from the connecting point backward in the shifting direction or vehicle longitudinal direction (or downward in the vertical direction in FIGS. 2 and 3).

When located in the neutral gate section 6a of shift gate 6, the shift lever 5 is elastically supported in a neutral position where the neutral gate section 6a intersects with the 3rd-4th gate section 6c. Manual transmission 2 is shifted into first gear by a selecting operation of moving the shift lever 5 along the neutral gate section 6a to the 1st-2nd gate section 6b, and a shifting operation of moving the shift lever 5 to a first gear position. Manual transmission 2 is shifted into second gear by a selecting operation of moving the shift lever 5 along the neutral gate section 6a to the 1st-2nd gate section 6b, and a shifting operation of moving the shift lever 5 to a second gear position. Manual transmission 2 is shifted into third gear by a selecting operation of moving the shift lever 5 along the neutral gate section 6a to the 3rd-4th gate section 6c, and a shifting operation of moving the shift lever 5 to a third gear position. Manual transmission 2 is shifted into fourth gear by a selecting operation of moving the shift lever 5 along the neutral gate section 6a to the 3rd-4th gate section 6c, and a shifting operation of moving the shift lever 5 to a fourth gear position. Manual transmission 2 is shifted into fifth gear by a selecting operation of moving the shift lever 5 along the neutral gate section 6a to the 5th-6th gate section 6d, and a shifting operation of moving the shift lever 5 to a fifth gear position. Manual transmission 2 is shifted into sixth gear by a selecting operation of moving the shift lever 5 along the neutral gate section 6a to the 5th-6th gate section 6d, and a shifting operation of moving the shift lever 5 to a sixth gear position. Manual transmission 2 is shifted into reverse gear by a selecting operation of moving the shift lever 5 along the neutral gate section 6a to the reverse gate section 6e, and a shifting operation of moving the shift lever 5 to a reverse gear position. The gearshifts described above are performed, when clutch pedal 4 is depressed to disengage the engine clutch 3, and disconnect the manual transmission 2 from engine 1.

Gearshift from one speed gear as a current speed gear to another as a target speed gear is implemented by an operation of disengaging the engine clutch 3 by depression of clutch pedal 4 to disconnect the manual transmission 2 from engine 1, a shifting operation of moving the shift lever 5 back from the shifting position corresponding to the current speed gear to the neutral gate section 6a, a selecting operation of moving the shift lever 5 to the selecting position corresponding the target speed gear, a shifting operation of moving the shift lever 5 in the shifting direction to the shifting position corresponding the target speed gear, and an operation of engaging the engine clutch 3 by release of clutch pedal 4 to drivingly connect the manual transmission 2 to engine 1.

Engagement of engine clutch 3 may cause a great shock called engagement shock, unless the rotational speeds of the engine-side and transmission-side engaging elements of engine clutch 3 are synchronous with each other. In order to implement the synchronization by engine speed control under condition engine clutch 3 is disengaged, the engine speed synchronizer is provided with an engine controller 11 as shown in FIG. 1.

Engine controller 11 is connected to various sensors, and configured to receive input of signals from the sensors. The sensors include a clutch pedal switch 12 for sensing the state of depression of clutch pedal 4 and entering an ON state when engine clutch 3 is disengaged, an engine rotation sensor 13 for sensing an engine speed "Ne" as the rotational speed of the output side of engine 1 (or the rotational speed of the engine-side engaging element of engine clutch 3 closer to engine 1), a transmission input rotation sensor 14 for sensing a transmission input speed "Ni" as the rotational speed of the input side of manual transmission 2 (or the rotational speed of the transmission-side engaging element of engine clutch 3 closer to manual transmission 2), a transmission output rotation sensor 15 for sensing a transmission output speed "No" as an output rotational speed of manual transmission 2, a selecting position sensor 16 for sensing the selecting position of shift lever 5 as the position of shift lever 5 in the selecting direction or vehicle lateral direction, and a shifting position sensor 17 for sensing the shifting position of shift lever 5 as the position of shift lever 5 in the shifting direction or vehicle longitudinal direction.

Selecting position sensor 16 stores definitions of a 1st/2nd selecting region, a 3rd/4th selecting region and a 5th/6th selecting region in relation to shift gate 6 as shown in FIG. 2, determines which one of the three selecting regions the shift lever 5 is located in, and outputs a corresponding signal to engine controller 11. Shifting position sensor 17 stores definitions of a 1st/3rd/5th shifting region, a 2nd/4th/6th shifting region and a neutral region in relation to shift gate 6 as shown in FIG. 3, determines which one of the three shifting regions the shift lever 5 is located in, and outputs a corresponding signal to engine controller 11. Engine controller 11 determines the position of shift lever 5 on the basis of the signals of selecting position sensor 16 and shifting position sensor 17, and determines operation of the shift lever 5 on the basis of change of the position of shift lever 5. Selecting position sensor 16 and shifting position sensor 17 serve as a sensor for sensing operation of shift lever 5.

Engine controller 11 controls the rotational speed of engine 1 with reference to the information from the sensors, for synchronizing the rotational speeds of the engine-side and transmission-side engaging elements of engine clutch 3 with each other, under condition that engine clutch 3 is disengaged. For example, the engine speed control may be implemented by adjusting the opening of an electronically controlled throttle valve not shown, and/or varying ignition timing.

The following describes the engine speed synchronization control carried out by engine controller 11. When engine clutch 3 is disengaged for allowing the manual transmission 2 to be shifted, engine controller 11 determines, with reference to the information from selecting position sensor 16 and shifting position sensor 17, which one of the gear positions is a starting point of operation of shift lever 5, and which one of the gear positions is an end point of operation of shift lever 5, and thus determines the current speed gear and the target speed gear. The operation of shift lever 5 causes the gear train of the manual transmission to shift from a state in which the current speed gear is engaged and the target speed gear is disengaged to a state in which the current speed gear is disengaged and the target speed gear is engaged, where the synchromesh mechanism serves for gear engagement.

In response to the operation of shift lever 5, engine controller 11 controls the engine speed so as to conform the rotational speed of the engine-side engaging element of engine clutch 3 to a value of the rotational speed of the transmission-side engaging element of engine clutch 3 (transmission input speed Ni) which is calculated on the basis of the transmission gear ratio of the target speed gear and the transmission output speed No. After synchronization of the rotational speeds of the engine-side and transmission-side engaging elements of engine clutch 3 is completed, engine clutch 3 is engaged according to release of clutch pedal 4, to connect the manual transmission 2 to engine 1. The synchronization of the rotational speeds of the engine-side and transmission-side engaging elements of engine clutch 3 before engagement of engine clutch 3 is effective for preventing the engine clutch 3 from causing a great shock when engaged.

Here, diagonal shifting operation is defined as a shifting operation of continuously moving the shift lever 5 at one stroke from a current speed gear position to a target speed gear position, with a force applied to the shift lever in the selecting direction, where the current speed gear position and the target speed gear position are diagonal with respect to each other, in contrast to the normal operation described above. Diagonal shifting operation may cause problems as described below.

Figure 4:
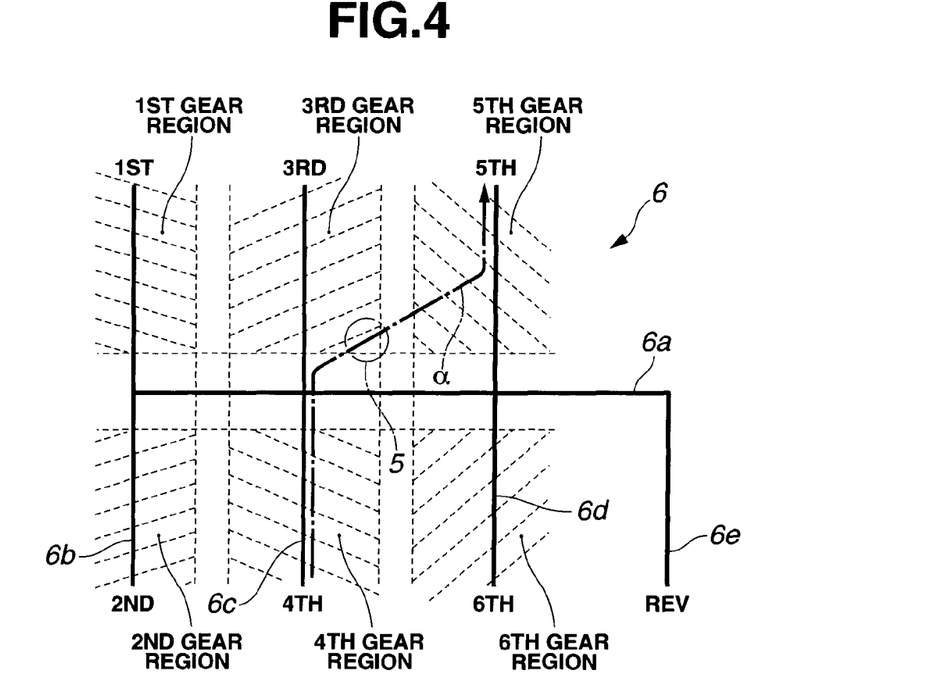
FIG. 4 is a third schematic plan view of the shift gate of FIG. 2 in which six gear regions are defined by combining the selecting regions of FIG. 2 and the shifting regions of FIG. 3 for determining a gear position of the shift lever.

The following describes with reference to FIG. 4 an example case in which fourth gear is a current speed gear, and fifth gear is a target speed gear. FIG. 4 shows six gear regions which are defined as combinations of the selecting regions shown in FIG. 2 and the shifting regions shown in FIG. 3, for determining where shift lever 5 is located. If a fourth to fifth gearshift is implemented by a diagonal shifting operation of shift lever 5 by a driver so that shift lever 5 moves along a curved arrow α, the shift lever 5 moves from the fourth gear region to the third gear region which has the same selecting position as the fourth gear region, and then moves from the third gear region to the fifth gear region. This causes sensors 16 and 17 and engine controller 11 to determine that the shift lever 5 moves from the fourth gear position to the third gear position, and then moves from the third gear position to the fifth gear position.

Figure 5A:
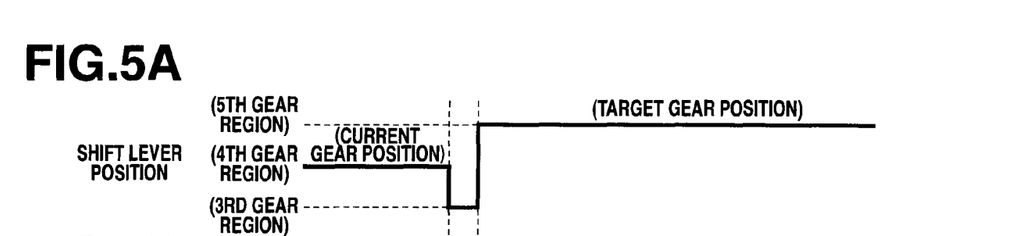
FIGS. 5A and 5B are time charts showing how an engine speed synchronizer according to a reference example synchronizes an output rotational speed of an engine of the powertrain system of FIG. 1, in response to a diagonal shifting operation of the shift lever which is indicated by a curved arrow α in FIG. 4.
Figure 5B:
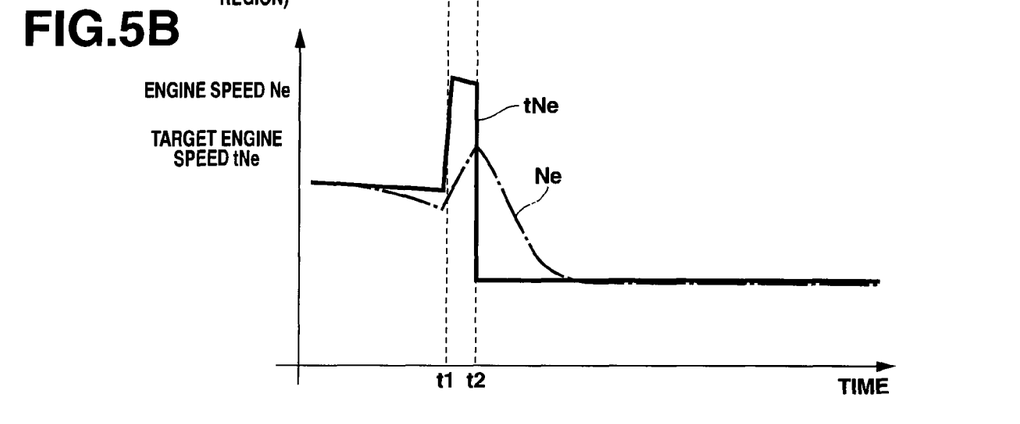

According to a reference example, during the diagonal shifting operation described above, for synchronization of the rotational speeds of the engine-side and transmission-side engaging elements of engine clutch 3, a target engine speed "tNe" is set as shown in FIG. 5B with reference to the position of shift lever 5 as shown in FIG. 5A. In FIG. 5B, at a time instant t1, the target engine speed tNe is set to increase from a value corresponding to fourth gear to a value corresponding to third gear, in response to the movement of shift lever 5 from the fourth gear region to the third gear region. At a time instant t2, target engine speed tNe is set to decrease from a value corresponding to third gear to a value corresponding to fifth gear, in response to the movement of shift lever 5 from the third gear region to the fifth gear region. Engine speed Ne is controlled to follow the target engine speed tNe, and specifically increase and then decrease as indicated by a long dashed short dashed line in FIG. 5B.

The engine speed synchronization control according to the reference example thus causes the engine speed Ne to temporarily increase, although the fourth to fifth gearshift is an upshift which requires a decrease of the engine speed Ne in conformance with a decrease in the transmission input speed Ni. This may make the driver uncomfortable.

In the present embodiment, engine controller 11 is configured to solve the problems described above. Specifically, engine controller 11 carries out a control process shown in FIG. 6 in which the engine speed synchronization control is permitted only when a precondition is satisfied.

Figure 6:
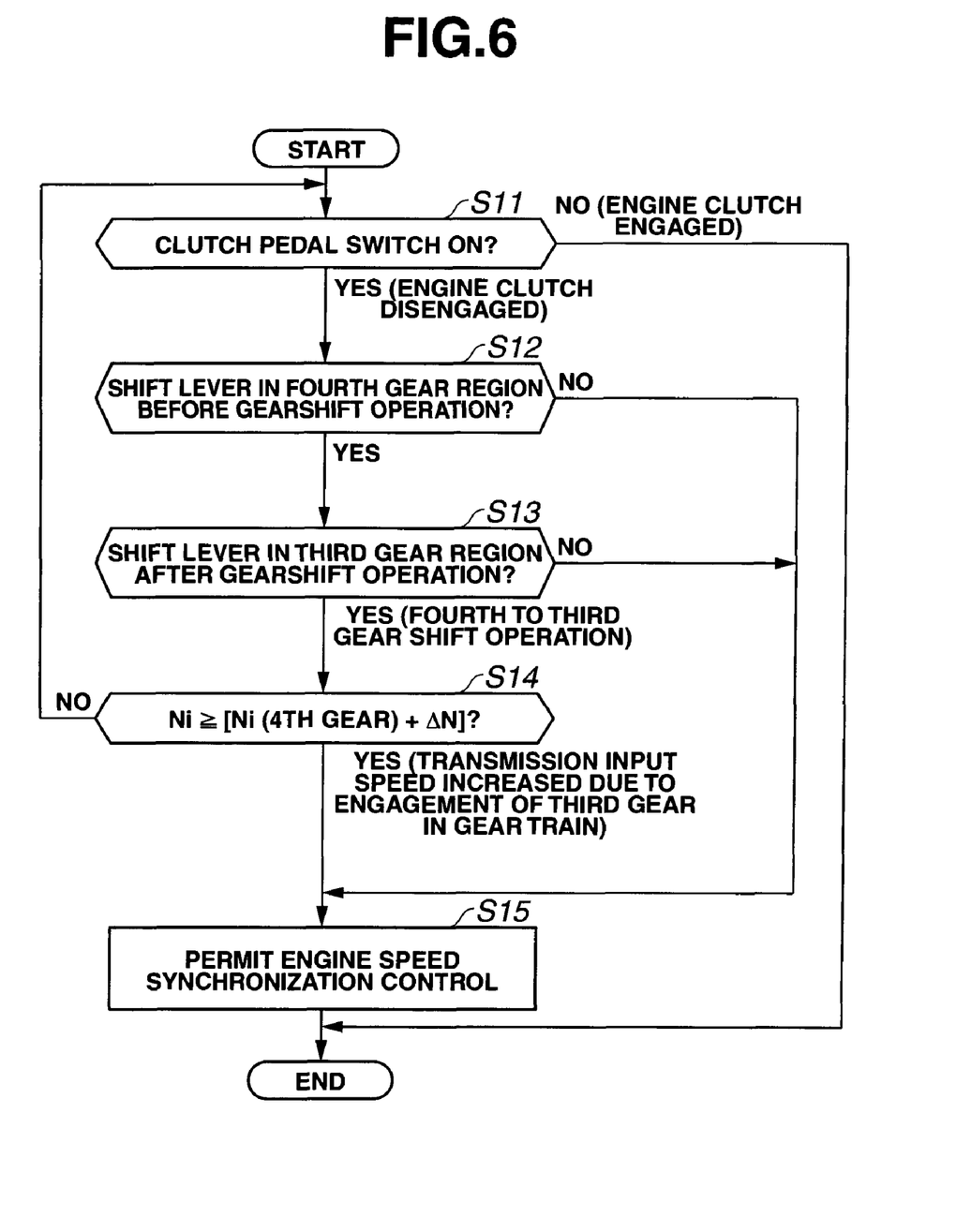
FIG. 6 is a flow chart showing a control process for determining whether to permit or inhibit engine speed synchronization control, which is performed by an engine controller of the engine speed synchronizer of FIG. 1.

At Step S11, engine controller 11 determines whether or not engine clutch 3 is disengaged for allowing the manual transmission 2 to be shifted, by checking whether or not clutch pedal switch 12 is ON. When the answer to Step S11 is negative (NO), that is, when clutch pedal switch 12 is OFF so that engine clutch 3 is engaged, then engine controller 11 returns from this control process, because synchronization of the rotational speeds of the engine-side and transmission-side engaging elements of engine clutch 3 is unnecessary.

When the answer to Step S11 is affirmative (YES), that is, when clutch pedal switch 12 is ON so that engine clutch 3 is disengaged, then engine controller 11 proceeds to Step S12, for synchronization of the rotational speeds of the engine-side and transmission-side engaging elements of engine clutch 3.

At Step S12, engine controller 11 determines whether or not shift lever 5 is positioned in the fourth gear region shown in FIG. 4 before a subject operation of shift lever 5. When the answer to Step S12 is YES, then engine controller 11 proceeds to Step S13.

At Step S13, engine controller 11 determines whether or not shift lever 5 is positioned in the third gear region after the operation of shift lever 5. When the answer to Step S13 is YES, then engine controller 11 proceeds to Step S14. In this way, when detecting a fourth to third gearshift operation which may cause problems as described above, then engine controller 11 performs the following special treatment.

At Step S14, engine controller 11 determines whether or not a current value of the transmission input speed Ni is higher than a value of the transmission input speed Ni corresponding to fourth gear as a current speed gear by a threshold speed change $\Delta N$. If the operation of shift lever 5 from the fourth gear region to the third gear region is actually based on driver's intention so that manual transmission 2 is actually shifted from a state in which the fourth gear is engaged to a state in which the third gear is engaged in the gear train, then the transmission input speed Ni increases. The threshold speed change $\Delta N$ is preset and used as a reference value to determine whether or not engagement of the third gear as a target speed gear in the gear train of manual transmission 2 is started. Engine controller 11 thus determines whether or not the transmission input speed Ni has started to change in a direction conforming to an operation of shift lever 5 by: determining whether or not change of the transmission input speed Ni due to the operation of shift lever 5 is above the threshold speed change $\Delta N$ in the conforming direction; determining that the transmission input speed Ni has started to change in the conforming direction, in response to determination that the change of the transmission input speed Ni due to the operation of shift lever 5 is above the threshold speed change $\Delta N$ in the conforming direction; and determining that the transmission input speed Ni has not started to change in the conforming direction, in response to determination that the change of the transmission input speed Ni due to the operation of shift lever 5 is not above the threshold speed change $\Delta N$ in the conforming direction.

When the answer to Step S14 is NO, then engine controller 11 proceeds back to Step S11, maintaining the engine speed synchronization control inhibited, without performing the operation of Step S15. Engine controller 11 thus inhibits the synchronization in response to determination that the transmission input speed has not started to change in the conforming direction. On the other hand, when the answer to Step S14 is YES, that is, when an increase in transmission input speed Ni is detected, then engine controller 11 proceeds to Step S15.

At Step S15, engine controller 11 permits the engine speed control for synchronization of the rotational speeds of the engine-side and transmission-side engaging elements of engine clutch 3. Engine controller 11 thus permits the synchronization in response to determination that the transmission input speed has started to change in the conforming direction.

When at least one of the answers to Steps S12 and S13 is NO, that is, when the operation of shift lever 5 includes no fourth to third gearshift operation, then engine controller 11 bypasses the operation of Step S14 and proceeds to Step S15 at which engine controller 11 permits the engine speed control for synchronization of the rotational speeds of the engine-side and transmission-side engaging elements of engine clutch 3 irrespective of the condition of Step S14.

Figures 8A, 8B:
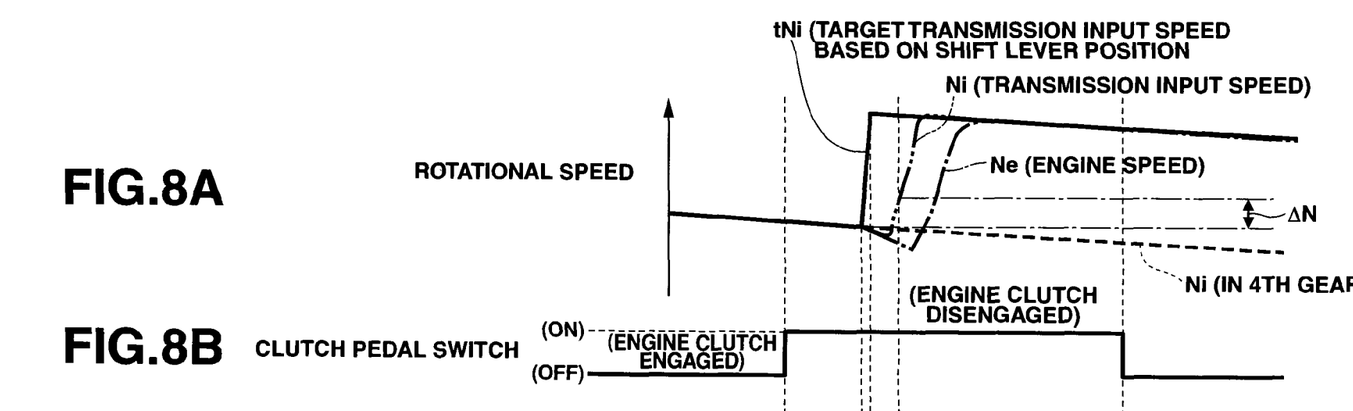
FIGS. 8A, 8B, 8C, 8D and 8E are time charts showing how the engine speed synchronizer according to the first embodiment performs engine speed synchronization control according to the control process of FIG. 6.
Figure 8C:
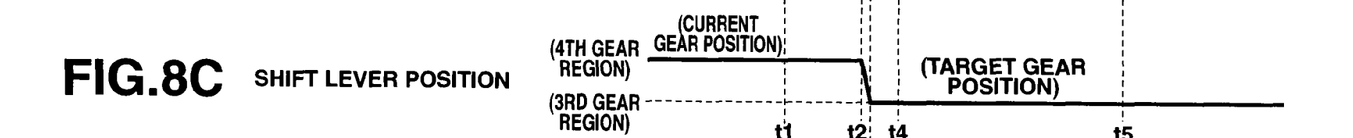
Figure 8D:
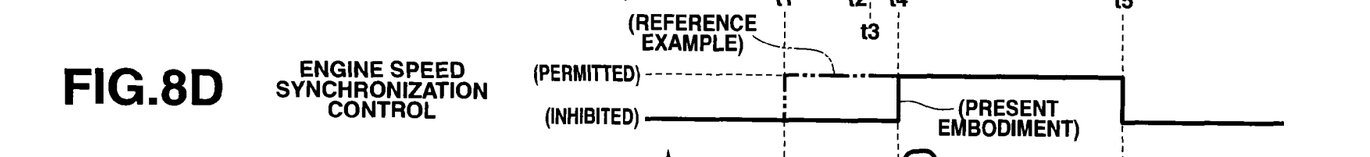
Figure 8E:
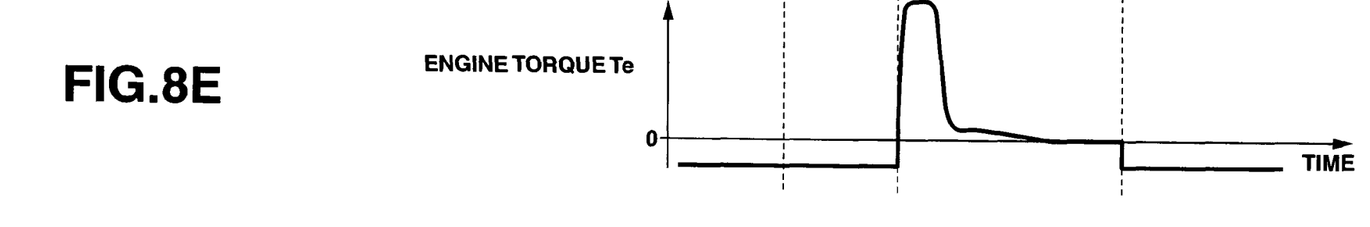

FIGS. 8A, 8B, 8C, 8D and 8E show an example case of how the engine speed synchronizer according to the first embodiment performs engine speed synchronization control according to the control process of FIG. 6 for synchronization of the rotational speeds of the engine-side and transmission-side engaging elements of engine clutch 3. In this example case, engine clutch 3 is disengaged at a time instant t1 as shown in FIG. 8B, and then shift lever 5 is operated from the fourth gear position to the third gear position to downshift the manual transmission 2 from fourth gear to third gear under condition that engine clutch 3 is disengaged, during a period from a time instant t2 to a time instant t3, as shown in FIG. 8C. In response to the downshift of manual transmission 2, the transmission input is speed Ni increases with delay to an increase of a target transmission input speed "tNi". After a time instant t4, engine torque "Te" changes as shown in FIG. 8E, and engine speed Ne increases as shown in FIG. 8A. Finally, engine clutch 3 is engaged at a time instant t5.

In the reference example in which no such operation as at Step S14 of FIG. 6 is performed, the engine speed synchronization control is permitted and started at time instant t1 when engine clutch 3 is disengaged, as shown by a long dashed double dotted line in FIG. 8D. In contrast, according to the present embodiment, as shown in FIG. 8D, the engine speed synchronization is permitted and started at time instant t4 when the transmission input speed Ni has increased higher by the threshold speed change ΔN than a value corresponding to fourth gear in response to engagement of the third gear in the gear train of manual transmission 2 during the fourth to third gearshift operation from time instant t2 to time instant t3. This is effective for preventing the target engine speed tNe and engine speed Ne from changing up and down, and making the driver uncomfortable, even when a driver performs a diagonal shifting operation of moving the shift lever 5 along the curved arrow α shown in FIG. 4 from the fourth gear position to the fifth gear position so that it is determined that the shift lever 5 passes through the third gear region during movement from the fourth gear region to the fifth gear region, as detailed below.

In the case of the diagonal shifting operation described above, the transmission input speed Ni does not increase as shown by the long dashed double dotted line in FIG. 8A. This is because the third gear remains disengaged in the gear train of manual transmission 2, although the shift lever 5 is temporarily positioned in the third gear region. Therefore, engine speed control for synchronization of the rotational speeds of the engine-side and transmission-side engaging elements of engine clutch 3 is inhibited and not performed, because the condition of (Ni≧Ni(fourth gear)+ΔN) is unsatisfied at Step S14 in FIG. 6. Then, engine speed control for synchronization of the rotational speeds of the engine-side and transmission-side engaging elements of engine clutch 3 is permitted and performed, when shift lever 5 reaches the fifth gear region after passing through the third gear region so that Step S14 in FIG. 6 is bypassed.

Figure 9A:
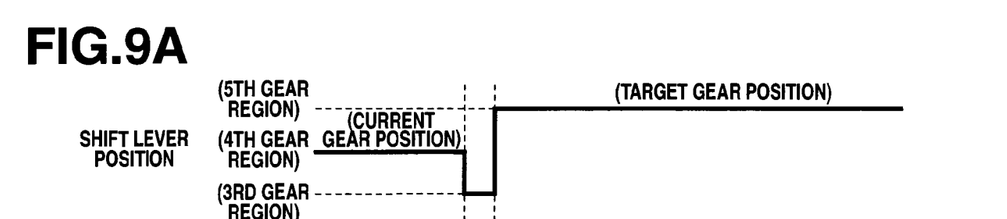
FIGS. 9A and 9B are time charts showing how the engine speed synchronizer according to the first embodiment synchronizes the output rotational speed of the engine, in response to the diagonal shifting operation of the shift lever which is indicated by the curved arrow α in FIG. 4.
Figure 9B:
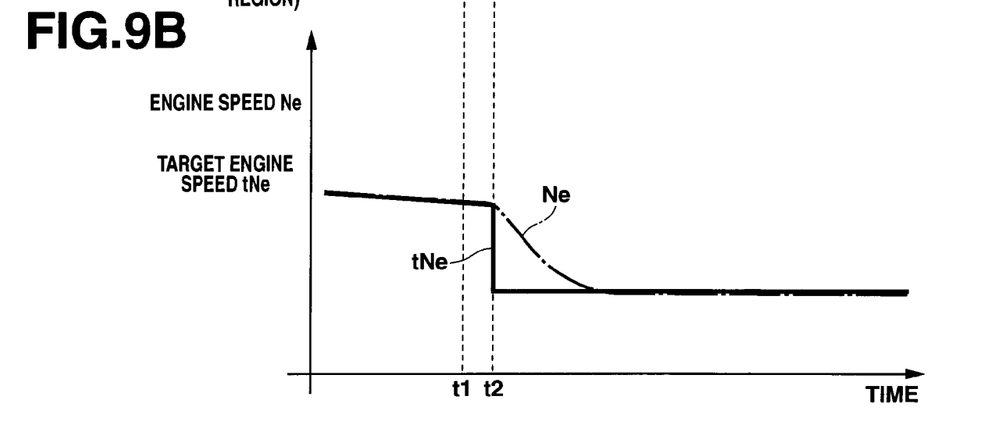

FIGS. 9A and 9B show how the engine speed synchronizer according to the first embodiment synchronizes the output rotational speed of engine 1, in response to the diagonal shifting operation of shift lever 5 which is indicated by the curved arrow α in FIG. 4. In contrast to the reference case of FIGS. 5A and 5B, the engine speed control for synchronization of the rotational speeds of the engine-side and transmission-side engaging elements of engine clutch 3 is started at time instant t2 as shown in FIGS. 9A and 9B. Engine controller 11 keeps the target engine speed tNe from increasing during a period from time instant t1 to time instant t2 at which shift lever 5 enters the fifth gear region, and then reduces the target engine speed tNe to a value corresponding to fifth gear at time instant t2, as shown in FIG. 9B. The engine speed Ne is controlled to follow the target engine speed tNe, decreasing without temporarily increasing, as shown by a long dashed short dashed line in FIG. 9B.

The monotonous decrease of engine speed Ne with no temporary inverse change by the engine speed synchronization control conforms to the fact that the fourth to fifth gearshift is an upshift which results in a decrease in the transmission input speed Ni, and requires a decrease in the engine speed. This prevents the driver from feeling uncomfortable.

Figure 7:
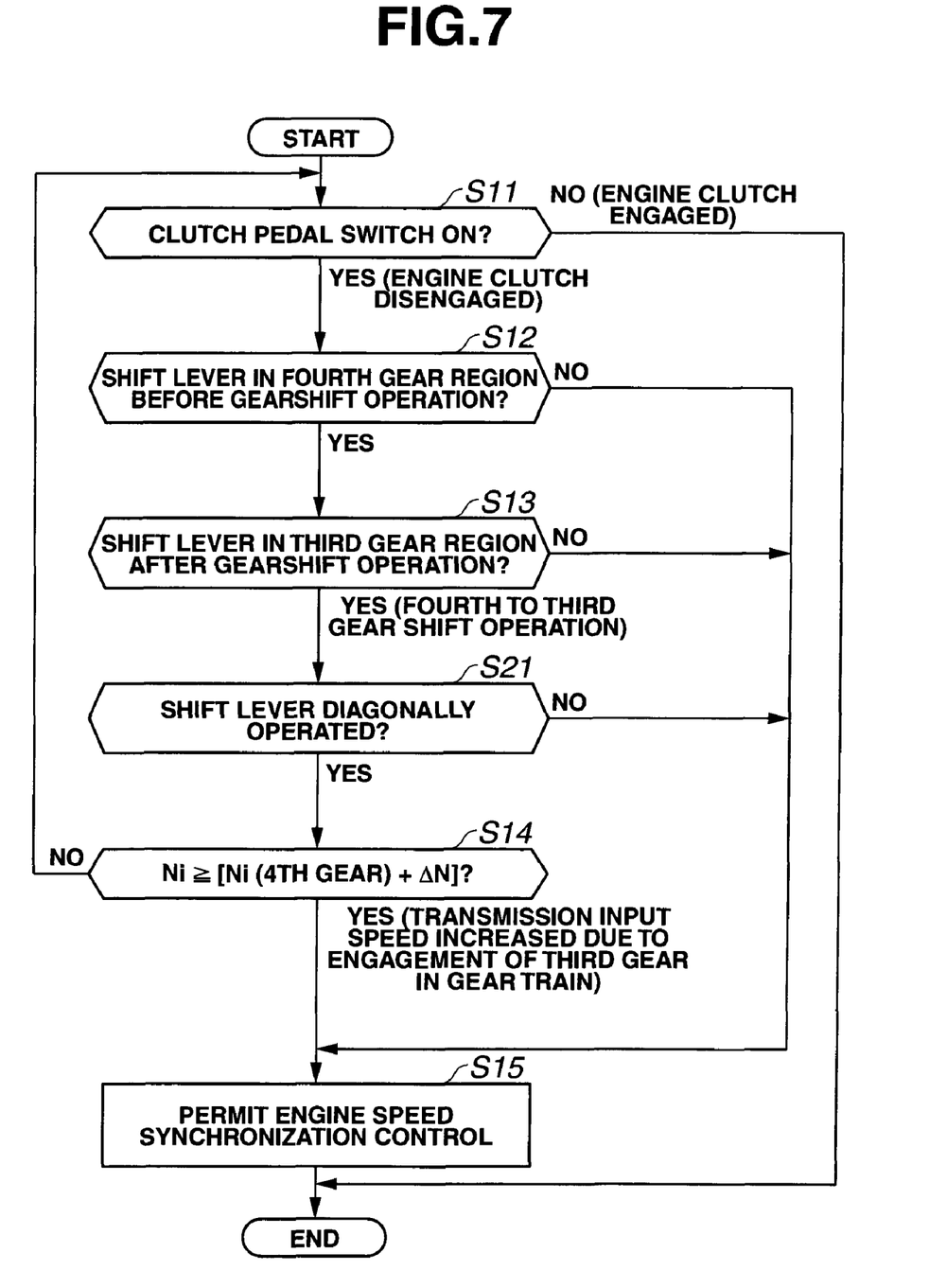
FIG. 7 is a flow chart showing a control process for determining whether to permit or inhibit engine speed synchronization control, which is performed by an engine controller of an engine speed synchronizer according to a second embodiment of the present invention.

According to the present embodiment, even in the example case shown in FIGS. 8A to 8E where the fourth to third gearshift operation is not a diagonal shifting operation which may make the driver uncomfortable, the engine speed synchronization control is inhibited until time instant t4, because the operation of Step S14 is always performed in response to detection of fourth to third gearshift operation of shift lever 5 at Steps S12 and S13. From this viewpoint, an engine speed synchronizer according to a second embodiment of the present invention is provided in which the control process of FIG. 6 is modified with respect to the first embodiment. FIG. 7 shows the control process according to the second embodiment, in which Step S21 is added between Steps S13 and S14 for detecting diagonal shifting operation.

After detecting a fourth to third gearshift operation at Steps S12 and S13, engine controller 11 determines, at Step S21, with reference to a selecting force applied to shift lever 5, whether or not the operation of shift lever 5 includes a diagonal shifting operation as shown by the curved arrow α in FIG. 4. Engine controller 11 refers to information outputted from a selecting force sensor 18 which is electrically connected to engine controller 11, and arranged to sense the selecting force applied to shift lever 5 in the selecting direction, as shown in FIG. 1. When it is determined that the selecting force has continued to be above a predetermined threshold value during the fourth to third gearshift operation, then engine controller 11 determines that the fourth to third gearshift operation is part of a diagonal shifting operation of shift lever 5. On the other hand, when it is determined that the selecting force has not continued to be above the predetermined threshold value during the fourth to third gearshift operation, then engine controller 11 determines that the fourth to third gearshift operation is not part of a diagonal shifting operation of shift lever 5.

When the answer to Step S21 is YES, that is, when it is determined that the fourth to third gearshift operation is part of a diagonal shifting operation of shift lever 5, then engine controller 11 proceeds to Step S14. When the condition of Step S14 is satisfied, engine controller 11 permits the engine speed synchronization control, as discussed in the case of the first embodiment shown in FIG. 6. On the other hand, when the answer to Step S21 is NO, that is, when it is determined that the fourth to third gearshift operation is not part of a diagonal shifting operation of shift lever 5 but conforms to driver's intention, then engine controller 11 proceeds to Step S15 at which engine controller 11 permits the engine speed synchronization control regardless of whether the condition of Step S14 is satisfied or unsatisfied.

According to the second embodiment, the operation of determining whether or not to permit the engine speed synchronization control at Step S14 is performed, only when the fourth to third gearshift operation is part of a diagonal shifting operation of shift lever 5. In the example case of FIGS. 8A to 8E where the fourth to third gearshift operation is not part of a diagonal shifting operation of shift lever 5, the engine speed synchronization control is permitted during the period from time instant t2 to time instant t3 before time instant t4 at which the operation of Step S14 is performed in the first embodiment. This prevents the start of the engine speed synchronization control from being delayed.

Although the fourth to fifth gearshift is considered as an example of diagonal shifting operation, and the problems caused by the operation of shift lever 5 of passing through the third gear region are considered in the present embodiments, the engine speed synchronizer and engine speed synchronization method described above may be applied to other diagonal shifting operations. For example, engine controller 11 may check and treat a situation where shift lever 5 passes through the first gear region during a second to third gearshift operation, as in the present embodiments. Similarly, engine controller 11 may check and treat a situation where shift lever 5 passes through the fourth gear region during a third to second gearshift operation, as in the present embodiments. Engine controller 11 may check and treat a situation where shift lever 5 passes through the sixth gear region during a fifth to fourth gearshift operation, as in the present embodiments. In summary, engine controller 11 may be configured to: inhibit the synchronization in response to determination that the transmission input speed Ni has not started to decrease, when the operation of shift lever 5 is an upshifting operation; and inhibit the synchronization in response to determination that the transmission input speed Ni has not started to increase, when the operation of shift lever 5 is a downshifting operation.

The entire contents of Japanese Patent Application 2008-165224 filed Jun. 25, 2008 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An engine speed synchronizer for a powertrain including an engine, a manual transmission and an engine clutch, the manual transmission including a shift lever arranged to individually engage speed gears of the manual transmission, the engine clutch having an engine side connected to an output side of the engine and a transmission side connected to an input side of the manual transmission, the engine speed synchronizer comprising:
   a first sensor for sensing an operation of the shift lever;
   a second sensor for measuring a transmission input speed as a rotational speed of the input side of the manual transmission; and
   a controller connected to the first and second sensors, and configured to:
      synchronize rotation of the engine side of the engine clutch with rotation of the transmission side of the engine clutch by controlling, with reference to an operation of the shift lever, an engine speed as a rotational speed of the output side of the engine, under condition that the engine clutch is disengaged;
      determine whether or not the transmission input speed has started to change in a direction conforming to the operation of the shift lever;
      permit the synchronization in response to a determination that the transmission input speed has started to change in the conforming direction; and
      inhibit the synchronization in response to a determination that the transmission input speed has not started to change in the conforming direction.

2. The engine speed synchronizer as claimed in claim 1, wherein:
   the shift lever is arranged to engage one of the speed gears of the manual transmission by a selecting operation of moving in a selecting direction to one of selecting positions, and a shifting operation of moving in a shifting direction from the one of selecting positions after the selecting operation;
   the engine speed synchronizer further comprises a third sensor for sensing a selecting force as a force applied to the shift lever in the selecting direction; and the controller is connected to the third sensor, and further configured to:
      determine with reference to the selecting force whether or not the operation of the shift lever includes a diagonal shifting operation; and
      inhibit the inhibition of the synchronization to permit the synchronization, in response to determination that the operation of the shift lever includes no diagonal shifting operation.

3. The engine speed synchronizer as claimed in claim 2, wherein the controller is further configured to:
   determine whether or not the selecting force has continued to be above a predetermined threshold value;
   determine that the operation of the shift lever includes a diagonal shifting operation, in response to determination that the selecting force has continued to be above the predetermined threshold value; and
   determine that the operation of the shift lever includes no diagonal shifting operation, in response to determination that the selecting force has not continued to be above the predetermined threshold value.

4. The engine speed synchronizer as claimed in claim 1, wherein the controller is further configured to:
   determine whether or not a change of the transmission input speed due to the operation of the shift lever is above a predetermined threshold value in the conforming direction;
   determine that the transmission input speed has started to change in the conforming direction, in response to a determination that the change of the transmission input speed due to the operation of the shift lever is above the predetermined threshold value in the conforming direction; and
   determine that the transmission input speed has not started to change in the conforming direction, in response to a determination that the change of the transmission input speed due to the operation of the shift lever is not above the predetermined threshold value in the conforming direction.

5. The engine speed synchronizer as claimed in claim 1, wherein the controller is configured to:
   inhibit the synchronization in response to determination that the transmission input speed has not started to decrease, when the operation of the shift lever is an upshifting operation; and
   inhibit the synchronization in response to determination that the transmission input speed has not started to increase, when the operation of the shift lever is a downshifting operation.

6. The engine speed synchronizer as claimed in claim 1, wherein:
   the shift lever is arranged to engage one of the speed gears of the manual transmission by a selecting operation of moving in a selecting direction to one of selecting positions, and a shifting operation of moving in a shifting direction from the one of selecting positions after the selecting operation; and
   the first sensor includes:
      a sensor for sensing a position of the shift lever in the selecting direction; and
      a sensor for sensing a position of the shift lever in the shifting direction.

7. An engine speed synchronizer for a powertrain including an engine, a manual transmission and an engine clutch, the manual transmission including a shift lever arranged to individually engage speed gears of the manual transmission, the engine clutch having an engine side connected to an output side of the engine and a transmission side connected to an input side of the manual transmission, the engine speed synchronizer comprising:

means for sensing an operation of the shift lever;

means for measuring a transmission input speed as a rotational speed of the input side of the manual transmission; and     means for:

synchronizing rotation of the engine side of the engine clutch with rotation of the transmission side of the engine clutch by controlling, with reference to an operation of the shift lever, an engine speed as a rotational speed of the output side of the engine, under condition that the engine clutch is disengaged;

determining whether or not the transmission input speed has started to change in a direction conforming to the operation of the shift lever;

permitting the synchronization in response to a determination that the transmission input speed has started to change in the conforming direction; and         inhibiting the synchronization in response to a determination that the transmission input speed has not started to change in the conforming direction.

8. An engine speed synchronization method for a powertrain including an engine, a manual transmission and an engine clutch, the manual transmission including a shift lever arranged to individually engage speed gears of the manual transmission, the engine clutch having an engine side connected to an output side of the engine and a transmission side connected to an input side of the manual transmission, the engine speed synchronization method comprising:

sensing an operation of the shift lever;

measuring a transmission input speed as a rotational speed of the input side of the manual transmission;

synchronizing rotation of the engine side of the engine clutch with rotation of the transmission side of the engine clutch by controlling, with reference to an operation of the shift lever, an engine speed as a rotational speed of the output side of the engine, under condition that the engine clutch is disengaged;

determining whether or not the transmission input speed has started to change in a direction conforming to the operation of the shift lever;

permitting the synchronization in response to a determination that the transmission input speed has started to change in the conforming direction; and     inhibiting the synchronization in response to a determination that the transmission input speed has not started to change in the conforming direction.

\* \* \* \* \*